United States Patent
Yamanoi et al.

(10) Patent No.: US 7,006,423 B2
(45) Date of Patent: Feb. 28, 2006

(54) MARK DETECTING CIRCUIT FOR AN OPTICAL DISK

(75) Inventors: Koyu Yamanoi, Chiba (JP); Eiichi Saiki, Oita (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/705,002

(22) Filed: Nov. 10, 2003

(65) Prior Publication Data

US 2004/0165514 A1    Aug. 26, 2004

(30) Foreign Application Priority Data

Dec. 11, 2002  (JP) .............................. 2002-359439

(51) Int. Cl.
  *G11B 5/09*  (2006.01)
  *H03F 3/00*  (2006.01)
(52) U.S. Cl. ............................. 369/59.25; 369/53.29; 369/53.34; 369/53.22; 369/44.29; 369/44.35
(58) Field of Classification Search ............ 369/59.25, 369/59.18, 30.22, 44.26, 44.28, 44.29, 44.34, 369/47.35, 47.19, 53.22, 53.23, 53.37, 275.3, 369/53.29, 53.34, 13.05, 44.35, 44.32
See application file for complete search history.

(56) References Cited

U.S. PATENT DOCUMENTS

| | | | | |
|---|---|---|---|---|
| 5,859,820 A | * | 1/1999 | Nagasawa et al. | 369/47.35 |
| 5,933,410 A | * | 8/1999 | Nakane et al. | 369/275.3 |
| 6,044,051 A | * | 3/2000 | Miyagawa et al. | 369/47.19 |
| 6,081,485 A | * | 6/2000 | Minase et al. | 369/53.37 |
| 6,240,055 B1 | * | 5/2001 | Takamine et al. | 369/44.29 |
| 6,396,778 B1 | * | 5/2002 | Takemura et al. | 369/44.29 |
| 6,526,006 B1 | * | 2/2003 | Yoshimi et al. | 369/44.28 |

* cited by examiner

*Primary Examiner*—William Korzuch
*Assistant Examiner*—Kim-Kwok Chu
(74) *Attorney, Agent, or Firm*—J. Dennis Moore; W. James Brady, III; Frederick J. Telecky, Jr.

(57) ABSTRACT

A mark detecting circuit that stably and reliably detects the marks for address information from an optical disk having tracks formed in a spiral shape and having waviness with a fixed period. In the land pre-pit signal extracting portion 12, by means of first bottom envelope circuit 32 with a high tracking speed, first bottom envelope signal $S_{btm1}$ that represents at high sensitivity the bottom envelope of push-pull signal $(S_A+S_B)-(S_C+S_D)$ is generated; and, by means of second bottom envelope circuit 34 with a low tracking speed, second bottom envelope signal $S_{btm2}$ that represents at low sensitivity the bottom envelope waveform of push-pull signal $(S_A+S_B)-(S_C+S_D)$ is generated. Then, with the signal, obtained by level shift treatment of said second bottom envelope signal $S_{btm2}$ using offset circuit 36, used as threshold signal $S_{ref}$, first bottom envelope signal $S_{btm1}$ is converted to a binary form. And land pre-pit signal $S_{LPP}$ is extracted from push-pull signal $(S_A+S_B)-(S_C+S_D)$.

8 Claims, 7 Drawing Sheets

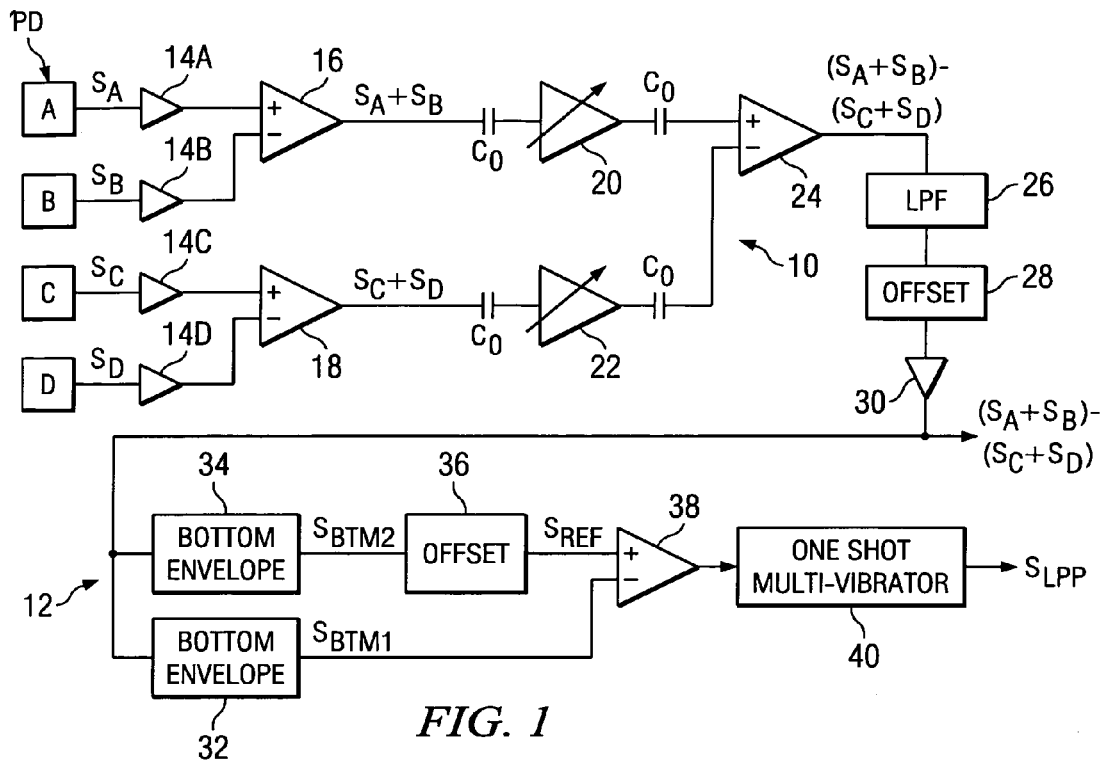
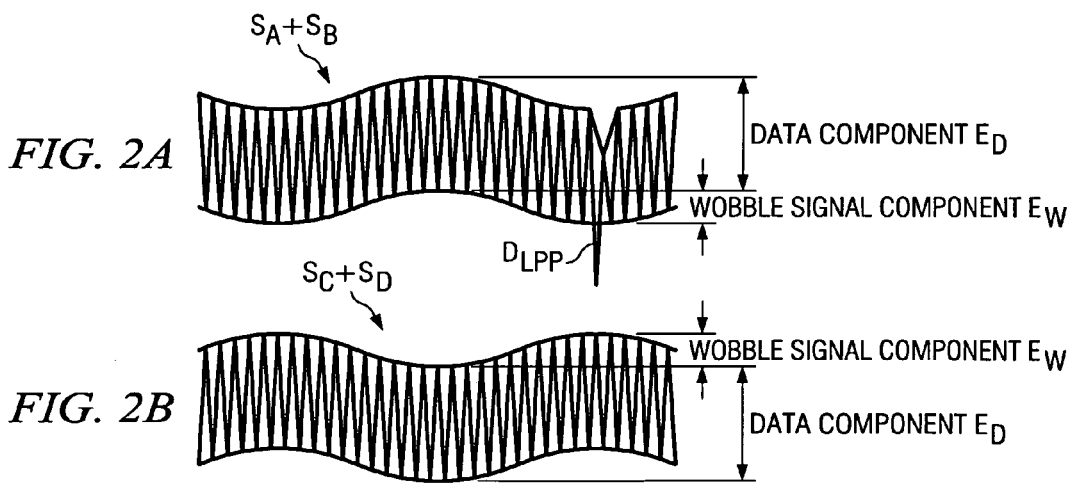
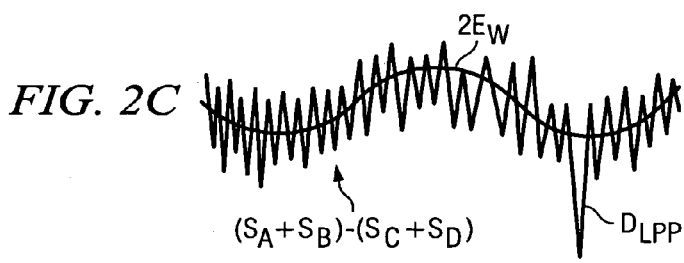

MARK DETECTING CIRCUIT FOR AN OPTICAL DISK

FIELD OF THE INVENTION

This invention pertains to a mark detecting circuit that is used in detecting marks for prescribed information (such as for address information) on an optical disk.

BACKGROUND OF THE INVENTION

Usually, the data recording surface of a write-enabled (reloadable) or rewrite-enabled optical disk is formed from grooves (groove portion) formed in a spiral shape and lands (ridge portion) formed between said grooves. On the wall surfaces of the grooves (the side surfaces of lands), portions of waviness known as wobbles, are formed repeatedly at a fixed period.

Typical physical types of DVDs (Digital Versatile Disk) include DVDs-R (reload type) and DVD-RW (rewrite type). For these types of DVDs, data are recorded on the grooves, and pits (marks) for address information known as land pre-pits (LPP) set according to prescribed rule are formed on the lands.

As shown in FIG. 13, when grooves on an optical disk in DVD-R format or DVD-RW format are tracked by an optical pickup, the returning light of laser beam LB or reflected laser light LB' is subject to differential detection using the push-pull method, and, as a result, a nearly sinusoidal push-pull signal $(S_A+S_B)-(S_C+S_D)$ is obtained corresponding to the waviness shape of the wobbles. Because the push-pull signal contains pyramidal land pre-pit signal $S_{LPP}$ indicating land pre-pits, by applying the push-pull signal $(S_A+S_B)-(S_C+S_D)$ on a comparator to be converted to a binary form with a prescribed threshold, one can extract or detect the land pre-pit signal $S_{LPP}$.

In practice, as shown in FIG. 14, before recording of data on tracks (grooves) (A) and after that (B), there is a significant difference in the waveform of the push-pull signal $(S_A+S_B)-(S_C+S_D)$ and in the waveform of land pre-pit signal $S_{LPP}$. That is, before recording, push-pull signal $(S_A+S_B)-(S_C+S_D)$ is maintained in a nearly sinusoidal shape, while land pre-pit signal $S_{LPP}$ has a nice pyramidal protrusion with high amplitude from near the minimum peak value of the wobble signal. Consequently, it is easy to convert land pre-pit signal $S_{LPP}$ to a binary form or to extract the signal. However, after recording, due to the influence of crosstalk by a RF signal component or data component recorded on the same track or on adjacent tracks, the push-pull signal $(S_A+S_B)-(S_C+S_D)$ cannot maintain the nearly sinusoidal waveform, and, at the same time, the amplitude of the land pre-pit signal $S_{LPP}$ decreases so that there is little difference in the amplitude from that of the RF signal component, and it is very hard to perform conversion of $S_{LPP}$ to binary form and extraction. Because it is impossible to correctly detect land pre-pit signal $S_{LPP}$, it is impossible to get the address of the recording data, and many errors take place in reloading, rewrite, or reproduction.

SUMMARY OF THE INVENTION

Embodiments of the invention solve the problems of the prior art by providing a type of mark detecting circuit for an optical disk characterized by the fact that it can stably and reliably detect the marks for prescribed information from an optical disk that has tracks with waviness of a fixed period formed in a spiral shape on it.

Embodiments of the present invention provide an address mark detecting circuit for an optical disk characterized by the following facts: the address mark detecting circuit for an optical disk is used in detecting marks for address information from an optical disk that has tracks formed in a spiral shape with waviness having a fixed period, and it has the following means: a push-pull signal generating means that differentially detects the returning light of an optical beam, which performs tracking for the tracks on said optical disk, by means of the push-pull method, and generates a push-pull signal; a first envelope detecting means that follows the bottom envelope or the top envelope of said push-pull signal, and generates a first envelope signal representing the waveform of said bottom envelope or top envelope; a threshold signal generating means that provides a threshold signal for converting the level of said envelope signal to a binary form; and an address mark detecting signal generating means that compares the level of said envelope signal with the level of said threshold signal, and generates an address mark detecting signal representing said address marks.

In the address mark detecting circuit for embodiments of this invention, by means of the first bottom envelope circuit, a first bottom envelope signal representing the waveform of the push-pull signal is generated. By means of the level of the threshold signal from a threshold signal generating means, the first bottom envelope signal is converted to binary form, and an address mark detecting signal is generated. By means of the first bottom envelope signal, it is possible to enhance the waveform of the address mark signal component contained in the push-pull signal. Consequently, it is possible to extract the address mark signal component from the push-pull signal in a stable and reliable way.

According to an embodiment of this invention, it is preferred that the first envelope detecting means have a means that can control to change the tracking speed with respect to the bottom envelope or top envelope of the push-pull signal corresponding to the rotating speed of the optical disk. By means of this constitution, even when the rotating speed of the optical disk is changed, one still can detect the address marks in a stable and reliable way.

Also, it is preferred that said threshold signal generating means have the following means: a second envelope detecting means that follows the bottom envelope or top envelope of said push-pull signal at a tracking speed lower than that in said first envelope detecting means and generates a second envelope signal that represents the waveform of said bottom envelope or top envelope; and a level shift means that level shifts said second envelope signal by a prescribed value and takes the obtained signal as said threshold signal. By means of this constitution, it is possible to convert the nominal (first) bottom envelope signal to the binary form by means of a synchronized threshold signal free of delay. It is possible to prevent erroneous detection completely, and it is possible to detect marks more correctly.

As an embodiment of this invention, said threshold signal generating means has a low-pass filter that lets the low-frequency portion of said push-pull signal pass through while cutting off the high-frequency portion, and a level shift means that level shifts the output signal of said low-pass filter by a prescribed value to get said threshold signal. Also, the threshold signal generating means may have a reference value generating means that outputs a signal at a preset constant level as said threshold signal.

As another embodiment of this invention, said push-pull signal generating means has a light detecting means, which performs light reception by a first light receiving region and a second light receiving region formed by bisecting in the radial direction the light of said light beam returning from said optical disk, and which outputs a first electrical signal and a second electrical signal corresponding to the light intensity of said returning light in said light receiving regions, respectively; and a subtracting means that generates said push-pull signal as the difference between said first electrical signal and said second electrical signal. In this constitution, it is preferred that said push-pull signal generating means have a first automatic gain controller and a second automatic gain controller that automatically controls the gains of amplification of said first electrical signal and second electrical signal such that the amplitude of the data component contained in said first electrical signal is nearly equal to that of the data component contained in said second electrical signal.

As yet another embodiment of this invention, said push-pull signal generating means has a light detecting means, which receives light by a first group of light receiving regions and a second group of light receiving regions that bisect the returning light of said light beam from said optical disk in the radial direction, and which outputs electrical signals corresponding to the light intensity of said returning light in the various light receiving regions belonging to said groups; a first adding means that determines the sum of plural said electrical signals obtained from said light receiving regions of said first group to generate a first sum signal; a second adding means that determines the sum of plural said electrical signals obtained from the light receiving regions of said second group to generate a second sum signal; and a subtracting circuit that determines the difference between said first sum signal and said second sum signal to generate said push-pull signal. In this constitution, it is preferred that said push-pull signal generating means have a first automatic gain controller and a second automatic gain controller that automatically controls the gains of amplification for said first electrical signal and second electrical signal, respectively, such that the amplitude of the data component contained in said first sum signal is nearly equal to that of the data component contained in said second sum signal.

As a preferable embodiment of this invention, this invention provides a type of address mark detecting circuit for an optical disk characterized by the following facts: for an optical disk for data recording, which has grooves formed in a spiral shape and with waviness having a fixed period and marks (such as land pre-pits) for providing address information of recording data and formed on the lands between adjacent said grooves, the address mark detecting circuit for an optical disk is used for detecting said marks, and it has the following means: a push-pull signal generating means that differentially detects the returning light of an optical beam, which performs tracking for the tracks on said optical disk, by means of the push-pull method, and generates a push-pull signal; a first envelope detecting means that follows the bottom envelope or the top envelope of said push-pull signal, and generates a first envelope signal representing the waveform of said bottom envelope or top envelope; a threshold signal generating means that provides a threshold signal for converting the level of said envelope signal to a binary form; and an address mark detecting signal generating means that compares the level of said envelope signal with the level of said threshold signal, and generates an address mark detecting signal representing said address marks (land pre-pits).

In another preferable embodiment of this invention, this invention provides a type of address mark detecting circuit for an optical disk characterized by the following facts: for an optical disk for data recording, which has grooves formed in a spiral shape and with waviness having a fixed period as well as lands for data recording set between adjacent said grooves, and which has marks (such as CAPA) for providing address information of recording data and formed at positions offset with a prescribed pitch in the radial direction with respect to said grooves or lands for each unit interval of the recording tracks, the address mark detecting circuit for optical disk is used for detecting said marks, and it has the following means: a push-pull signal generating means that differentially detects the returning light of an optical beam, which performs tracking for the tracks on said optical disk, by means of the push-pull method, and generates a push-pull signal; a first envelope detecting means that follows the bottom envelope or the top envelope of said push-pull signal, and generates a first envelope signal representing the waveform of said bottom envelope or top envelope; a threshold signal generating means that provides a threshold signal for converting the level of said envelope signal to a binary form; and an address mark detecting signal generating means that compares the level of said envelope signal with the level of said threshold signal, and generates an address mark detecting signal representing said address marks.

Also in another embodiment of the invention, the mark detecting circuit for an optical disk has the following parts: an input terminal for input of a read signal having a first signal component corresponding to the physical shape of the recording region of the optical disk recording medium and a second signal component corresponding to the marks for prescribed information recorded on said recording region; a first signal generating circuit that has said read signal as input and generates a first signal containing said first signal component; a second signal generating circuit that has said read signal as input and generates a second signal containing said second signal component; and a mark detecting circuit generating circuit that compares said first signal and said second signal to generate a mark detecting signal corresponding to said second signal component.

Also in another embodiment of the invention another mark detecting circuit for an optical disk in this invention has the following parts: an input terminal for input of a radial push-pull signal having a first signal component corresponding to the physical shape of the recording region of the optical disk recording medium and a second signal component corresponding to the marks for prescribed information recorded on said recording region; a first signal generating circuit that generates a first signal tracking the top envelope or bottom envelope of said radial push-pull signal and corresponding to the waveform of said top envelope or bottom envelope; a second signal generating circuit that has tracking characteristics that are faster than the tracking characteristics of said first signal generating circuit, and generates a second signal tracking the top envelope or bottom envelope of said radial push-pull signal and corresponding to the waveform of said top envelope or bottom envelope; and a mark detecting circuit generating circuit that compares said first signal and said second signal to generate a mark detecting signal corresponding to said second signal component.

BRIEF DESCRIPTION OF THE DRAWINGS

FIG. 1 is a block diagram illustrating the circuit constitution of a land pre-pit detecting circuit in an embodiment of this invention.

FIG. 2 is a waveform diagram illustrating schematically waveforms of the sum signal and push-pull signal obtained in the embodiment.

REFERENCE NUMERALS AND SYMBOLS AS SHOWN IN THE DRAWINGS

Figure 3:
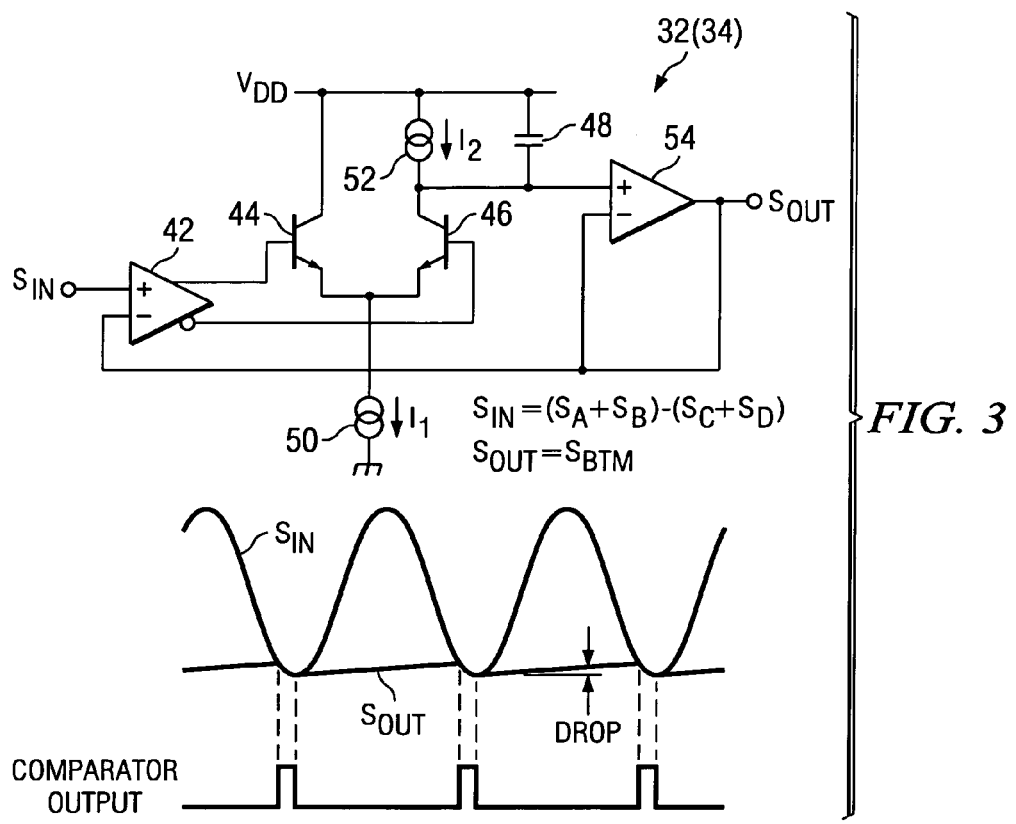
FIG. 3 is a circuit diagram illustrating an example of the circuit constitution of a bottom envelope circuit used in the land pre-pit signal extracting portion of the embodiment.

In the figures, 10 represents a push-pull signal generating portion and 12 represents a land pre-pit signal extracting portion; PD represents a photodetector, A, B, C, D represents a light receiving region, 16, 18 represents an adder, 20, 22 represents an automatic gain controller, 24 represents a subtracter; 32 represents a first bottom envelope circuit, 34 represents a second bottom envelope circuit, 36 represents an offset circuit, 38 represents a comparator, 40 represents an one-shot multivibrator, 56 represents a low-pass filter, 58 represents a reference value generator, 80 represents a top envelope circuit, and 82 represents a comparator.

DESCRIPTION OF THE EMBODIMENTS

In the following, preferable embodiments of this invention will be explained with reference to the drawings.

FIG. 1 is a diagram illustrating the circuit constitution of a land pre-pit detecting circuit in an embodiment of this invention. This land pre-pit detecting circuit is for detecting the land pre-pits (LPP) formed as pre-format on an optical disk of DVD-R format or DVD-RW format.

This land pre-pit detecting circuit has push-pull signal generating portion 10 that generates a push-pull signal representing the groove wobbles on the optical disk based on the returning light of a laser beam from the optical disk (not shown in the figure), that is, reflected laser light LB', and land pre-pit signal extracting portion 12 that extracts land pre-pit signal $S_{LPP}$ representing land pre-pits LPP from the push-pull signal obtained by said push-pull signal generating portion 10.

Push-pull signal generating portion 10 has four gain control amplifiers 14A, 14B, 14C, 14D, two adders 16, 18, two automatic gain controllers 20, 22, subtracter 24, low-pass filter 26, offset circuit 28, and gain control amplifier 30.

Figure 13:
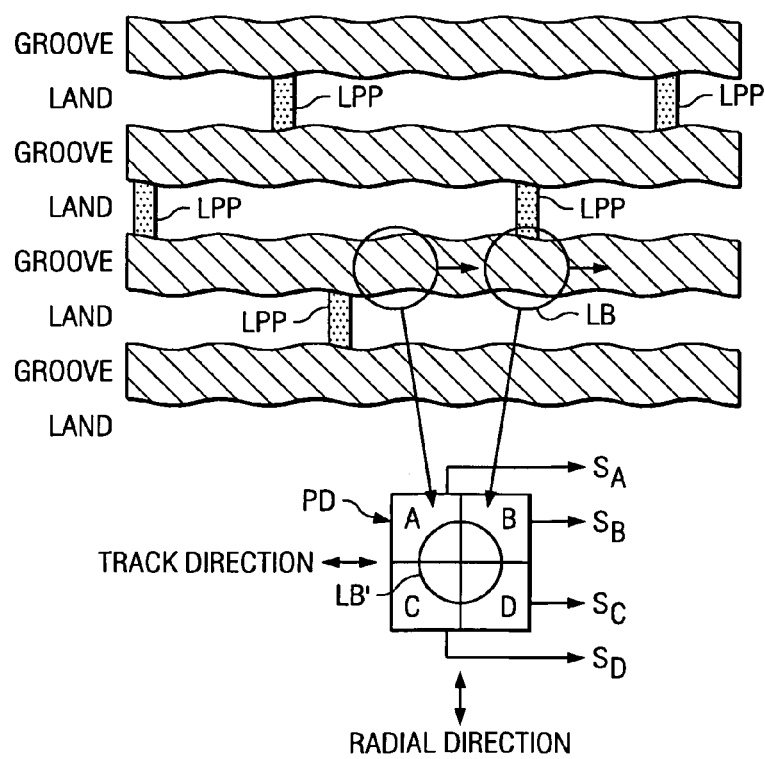
FIG. 13 is a schematic diagram illustrating the DVD-R and DVD-RW formats (especially land pre-pits LPP).
Figure 14A:
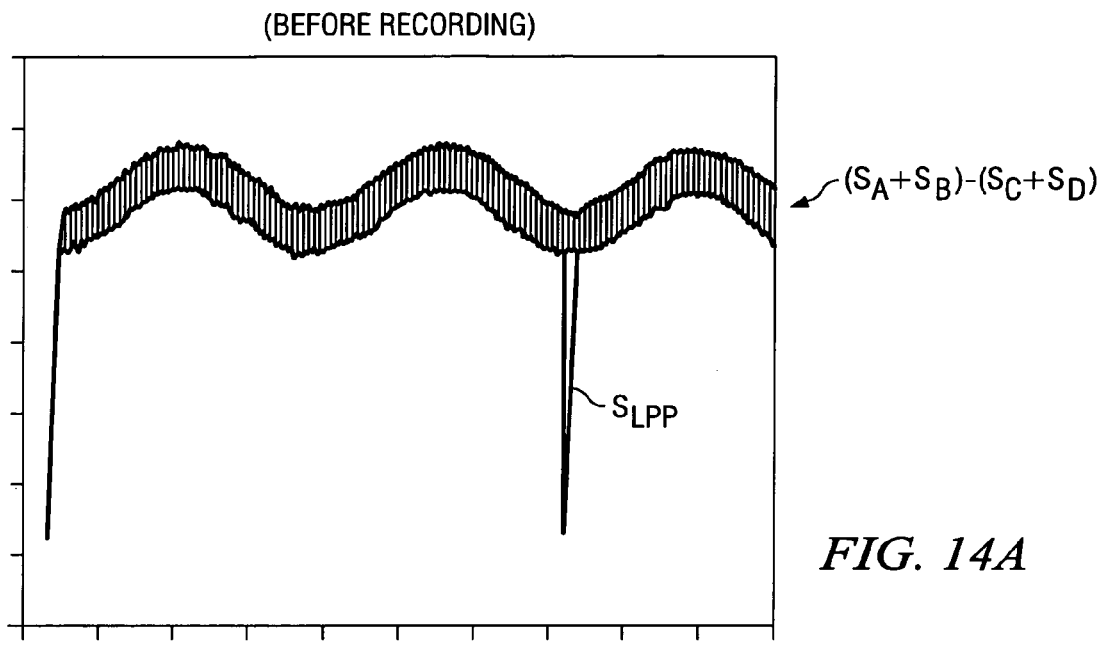
FIG. 14 is a diagram illustrating the waveforms of the push-pull signal and land pre-pit signal in the DVD-R and DVD-RW formats.
Figure 14B:
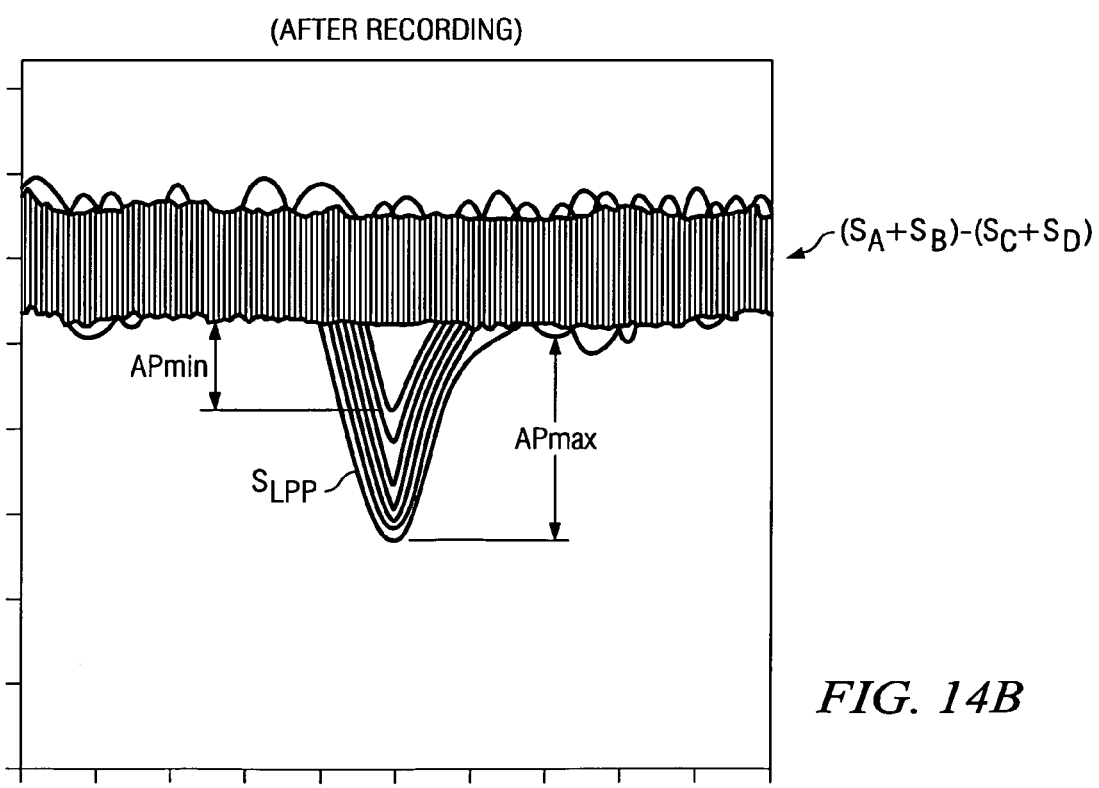

RF signals $S_A$, $S_B$, $S_C$, $S_D$ are input into gain control amplifiers 14A, 14B, 14C, 14D from four light receiving regions A, B, C, D that form the push-pull type quarter-division type photodetector PD as shown in FIG. 13. In photodetector PD shown in FIG. 13, four light receiving regions A, B, C, D are divided and set abutting from the four sides. For example, light receiving regions A, B, C, D are made of photodiodes, and, corresponding to the received light quantity or received light luminance of the received reflected laser light, electrical signals or RF signals $S_A$, $S_B$, $S_C$, $S_D$ are formed. These RF signals are subject to I-V conversion in an optical pickup (not shown in the figure), and the obtained voltage signals are output.

Gain control amplifiers 14A, 14B, 14C, 14D amplify RF signals $S_A$, $S_B$, $S_C$, $S_D$ at a prescribed gain with reference to the same reference voltage as that applied to the optical pickup. RF signals $S_A$, $S_B$ that are amplified by gain control amplifiers 14A, 14B, respectively, are input to adder 16. Adder 16 sums two input signals $S_A$, $S_B$, and outputs the sum signal $(S_A+S_B)$ of the waveforms as shown in FIG. 2(A). On the other hand, RF signals $S_C$, $S_D$ that are amplified by gain amplifiers 14C, 14D, respectively, are input to other adder 18. Adder 18 sums two input signals $S_C$, $S_D$, and outputs the sum signal $(S_C+S_D)$ with the waveform, for example, shown in FIG. 2(B). Also, two adders 16, 18 may be formed by amplifiers.

As shown in FIGS. 2(A), (B), the sum signals $(S_A+S_B)$, $(S_C+S_D)$ obtained when data are recorded on tracks (grooves) on the optical disk have a waveform obtained by overlapping wobble signal $E_W$ as modulation signal on the constant-amplitude RF signal or data component $E_D$. Also, as the wobbles on the outer peripheral portion of the tracks (grooves) and the wobbles on the inner peripheral portion are set with waviness parallel to each other, the wobble signal component obtained from regions (A, B) corresponding to the wobbles in the outer peripheral portion and the wobble signal component obtained from regions (C, D) corresponding to the wobbles in the inner peripheral portion have their phases deviated from each other by 180°. Also, as shown in FIG. 13, when laser beam LB tracking the grooves passes through the neighborhood of each of adjacent land pre-pits LPP on the outer peripheral side, said land pre-pit LPP causes diffraction, so that the level falls significantly for RF signal $S_A$, $S_B$ or sum signal $(S_A+S_B)$ obtained from regions (A, B) corresponding to the wobbles on the outer peripheral portion. This steep pyramidal collapse $D_{LPP}$ is the land pre-pit signal component. Also, when laser beam LB during tracking operation passes through the neighborhood of each of adjacent land pre-pits LPP on the inner peripheral side, the level of RF signals $S_C$, $S_D$ or sum signal $(S_C+S_D)$ obtained from regions (C, D) corresponding to the wobbles in the inner peripheral portion falls steeply. However, usually, only a land pre-pit LPP adjacent to the outer peripheral side is taken as the detection object, and a land pre-pit LPP on the inner peripheral side can be ignored.

Sum signals $(S_A+S_B)$, $(S_C+S_D)$ obtained by adders 16, 18 are sent to automatic gain controllers 20, 22, respectively. Two automatic gain controllers 20, 22 automatically control the gain of amplification for two sum signals $(S_A+S_B)$, $(S_C+S_D)$ so that the amplitudes of the data components $E_D$ of two sum signals $(S_A+S_B)$, $(S_C+S_D)$ become uniform (equal to each other). The amplifier under AGC control may be a dedicated amplifier (not shown in the figure), or adders 16, 18 of the former section. In the input side and output side of two automatic gain controllers 20, 22, capacitors $C_a$, $C_b$ for canceling offset are inserted, respectively.

Subtracter 24 has sum signal $(S_A+S_B)$ from automatic gain controller 20 and sum signal $(S_C+S_D)$ from automatic gain controller 22 input to its positive-side terminal and negative-side terminal, respectively, and, by performing subtraction, it outputs difference signal $(S_A+S_B)-(S_C+S_D)$ representing the difference between said two sum signals. Basically, one can use the difference signal $(S_A+S_B)-(S_C+S_D)$ output from said subtracter 24 as a radial push-pull signal (hereinafter to be referred to as push-pull signal). In this embodiment, this difference signal sequentially passes through low-pass filter 26, offset circuit 28 and gain control amplifier 30, so that harmonic noise is removed, offset of the signal processing is compensated, and the gain is increased appropriately. The obtained nominal push-pull signal is output to land pre-pit signal extracting portion 12 as the latter section.

For push-pull signal $(S_A+S_B)-(S_C+S_D)$ obtained using said push-pull signal generating portion 10, in an ideal case, the data components $E_D$ of the two sum signals $(S_A+S_B)$, $(S_C+S_D)$ cancel each other, while the wobble signal components $E_W$ of said two sum signals $(S_A+S_B)$, $(S_C+S_D)$ are added (doubled). For example, if the peak-to-peak value of data component $E_D$ of two sum signals $(S_A+S_B)$, $(S_C+S_D)$ after AGC is 1 $V_{PP}$, and the amplitude of wobble signal $E_W$ is 5% of the amplitude of data component $E_D$, in said ideal case, wobble signal component $E_W$ in nearly sinusoidal waveform and having a peak-to-peak value of 100 mVpp is left. However, in practice, a large signal over 6 T (here, T is the length of 1 bit) has its amplitude determined in AGC, while for signals of 3 T, 4 T, 5 T, etc., if unbalance between the two sum signals $(S_A+S_B)$, $(S_C+S_D)$ exists, a residue still exists after subtraction. Especially, for the 3 T signal, an amplitude exists of at least about 15% of the overall data component. Consequently, if the unbalance component is 30% of the 3 T signal, a data component of nearly the same amplitude as that of wobble signal component $E_W$ is left in the push-pull signal.

In this way, when laser beam LB tracks the track (groove) with data recorded on it, as illustrated schematically in FIG. 2(C), push-pull signal $(S_A+S_B)-(S_C+S_D)$ obtained from push-pull signal generating portion 10 has a significant amount of residue for not only wobble signal component $E_W$, but also for the RF component or data component, and it is hard to observe land pre-pit signal component $D_{LPP}$.

In this embodiment, however, land pre-pit signal extracting portion 12 to be explained later can correctly determine land pre-pit signal component $D_{LPP}$ from push-pull signal $(S_A+S_B)-(S_C+S_D)$, and it is possible to extract land pre-pit signal $S_{LPP}$ in a stable and reliable way.

Land pre-pit signal extracting portion 12 has two bottom envelope circuits 32, 34, offset circuit 36, comparator 38, and one-shot multivibrator 40.

FIG. 3 is a diagram illustrating an example of the circuit constitution of bottom envelope circuits 32, 34. These bottom envelope circuits 32, 34 have differential comparator 42 that generates complementary binary logic outputs, a pair of NPN transistors 44, 46 connected to the non-inverting output terminal and inverting output terminal of comparator 42, respectively, capacitor 48 for holding, source type constant-current source circuit 50 for charging, sink type constant-current source circuit 52 for discharge, and voltage follower 54 for output buffer.

Differential comparator 42 compares the voltage level of input signal $S_{in}$ with the voltage level of output signal $S_{out}$, and, when input signal $S_{in}$ is lower than output signal $S_{out}$, it turns transistor 44 OFF, and turns transistor 46 ON. As a result, source type constant-current source circuit 50 charges hold capacitor 48 at a constant current $(I_1-I_2)$ through transistor 46 that is ON, so that the charging voltage of capacitor 48, and hence the voltage level of output signal $S_{out}$, fall (decrease in negative direction) as they track input signal $S_{in}$. As input signal $S_{in}$ reaches the bottom peak value and then turns to rise, and finally becomes higher than output signal $S_{out}$, differential comparator 42 turns transistor 44 ON and turns transistor 46 OFF. Then, sink type constant-current source circuit 52 discharges hold capacitor 48 at a constant current 12. As a result, the charging voltage of capacitor 48, and hence the voltage level of output signal $S_{out}$, rise (decrease in the negative direction) at a nearly constant drop rate. As input signal $S_{in}$ becomes lower than output signal $S_{out}$, the same operation as is repeated. In this way, output $S_{out}$ representing the bottom envelope waveform of input signal $S_{in}$, that is, bottom envelope signal $S_{btm}$, is obtained.

By adjusting currents $I_1$, and $I_2$ of constant-current source circuits 50, 52, said bottom envelope circuits 32, 34 can be controlled to change the tracking speed of input signal $S_{in}$ with respect to the bottom envelope. That is, as the relative value of current $I_1$ with respect to current $I_2$, $(I_1-I_2)$, is increased, the charging rate of capacitor 48 increases, and the speed of output signal $S_{out}$ in tracking input signal $S_{in}$ towards the bottom peak value increases. Also, as current 12 rises, the discharge rate of capacitor 48 increases, and the speed or drop rate of output signal $S_{out}$ in tracking input signal $S_{in}$ when it rises from the bottom peak value increases.

In this embodiment, the tracking speed of first bottom envelope circuit 32 is set high. On the other hand, the tracking speed of second bottom envelope circuit 34 is set low. That is, in first bottom envelope circuit 32, output signal $S_{out}$ ($S_{btm1}$) follows the bottom envelope of input signal $S_{in}$ $\{(S_A+S_B)-(S_C+S_D)\}$ at high speed and high precision, and it can follow land pre-pit signal component $D_{LPP}$ until near the bottom peak value. On the other hand, in second bottom envelope circuit 34, output signal $S_{out}$ ($Sb_{tm2}$) slowly follows the waveform of the bottom envelope of input signal $S_{in}$. With respect to land pre-pit signal component $D_{LPP}$, as a response to said tracking operation, the level falls by a certain degree and then stops, and it cannot follow until near the bottom peak value.

Figure 4:
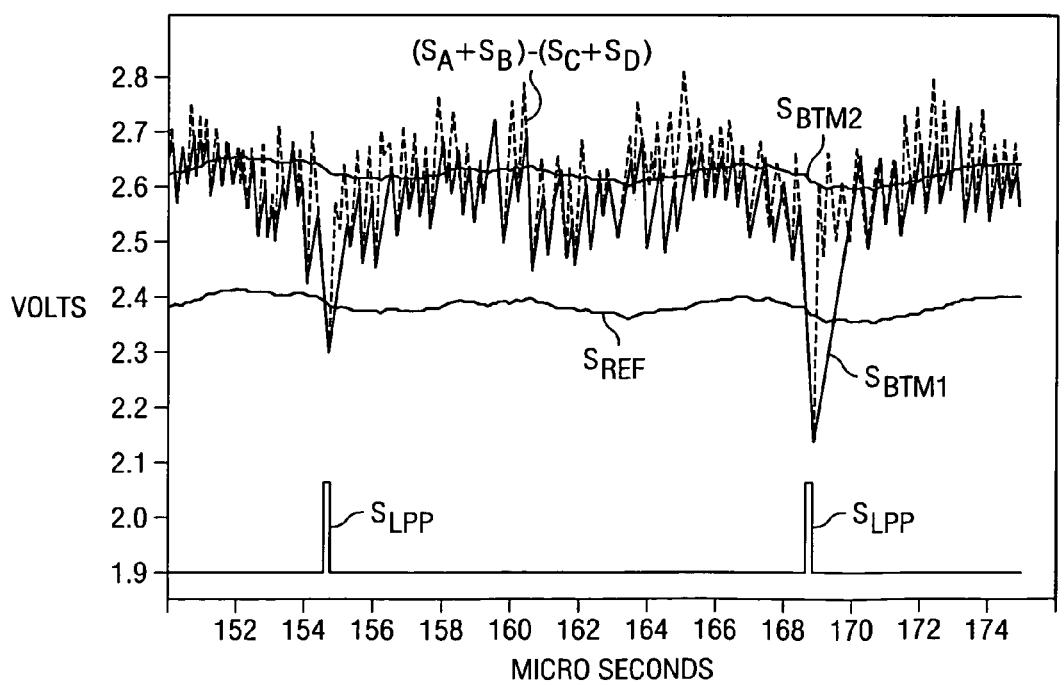
FIG. 4 is a diagram illustrating simulation waveforms illustrating the function of the land pre-pit signal extracting portion in the embodiment.

FIG. 4 is a diagram illustrating a waveform of simulation that shows the operation in land pre-pit signal extracting portion 12 in this embodiment. In this simulation, the drop rate is set at 400 mV/μs in first bottom envelope circuit 32, and it is set at 25 mV/μs in second bottom envelope circuit 34.

As shown in FIG. 4, bottom envelope signal $S_{btm1}$ obtained from first bottom envelope circuit 32 follows the bottom peak of the input signal, that is, push-pull signal $(S_A+S_B)-(S_C+S_D)$, with high fidelity, and it also follows land pre-pit signal component $D_{LPP}$ until near the minimum peak, and forms a pyramidal waveform. On the other hand, bottom envelope signal $S_{btm2}$ obtained from second bottom envelope circuit 34 follows the bottom peak of input signal $(S_A+S_B)-(S_C+S_D)$ mildly at a low speed, and it evolves a near average value. With respect to land pre-pit signal component $D_{LPP}$, the level only falls bluntly and then stops.

As shown in FIG. 1, bottom envelope signal $S_{btm1}$ from first bottom envelope circuit 32 is input to the negative terminal of comparator 38. On the other hand, bottom envelope signal $S_{btm2}$ from second bottom envelope circuit 34 is input to offset circuit 36. Offset circuit 36 performs level shift or offset by a prescribed value for bottom envelope signal $S_{btm2}$, and sends the obtained signal as threshold signal $S_{ref}$ to the positive terminal of comparator 38. In the simulation shown in FIG. 4, the level shift or offset value is selected to be −240 mV.

Comparator 38 compares the levels of two input signals $S_{btm2}$ and $S_{ref}$, and outputs a binary signal having a logic level corresponding to their relative magnitudes. More specifically, when $S_{btm2}<S_{ref}$, an H-level is output, and, when $S_{btm2}>S_{ref}$, an L-level is output. One-shot multivibrator 40 works responding to the fall edge (H→L) of the output signal of comparator 38, and it outputs an H-level output signal with a prescribed pulse width as land pre-pit signal $S_{LPP}$ (FIG. 4).

As explained above, in land pre-pit signal extracting portion 12 in this embodiment, by means of first bottom envelope circuit 32 having a high tracking speed, first bottom envelope signal $S_{btm1}$ that represents the bottom envelope of push-pull signal $(S_A+S_B)-(S_C+S_D)$ at high sensitivity is generated. On the other hand, by means of second bottom envelope circuit 34 with a low tracking speed, second bottom envelope signal $S_{btm2}$ representing the bottom envelope waveform of push-pull signal $(S_A+S_B)-(S_C+S_D)$ is generated. With the signal obtained by level shifting said second bottom envelope signal $S_{btm2}$ used as threshold signal $S_{ref}$, first bottom envelope signal $S_{btm1}$ is converted to a binary form, so that it is possible to extract land pre-pit signal $S_{LPP}$ from push-pull signal $(S_A+S_B)-(S_C+S_D)$ in a stable and reliable way.

Especially, in this embodiment, by means of second bottom envelope signal $S_{btm2}$ representing the bottom envelope waveform of push-pull signal $(S_A+S_B)-(S_C+S_D)$, it is possible to convert first (nominal) bottom envelope signal $S_{btm1}$ to binary form by means of synchronized threshold signal $S_{ref}$ without delay. As a result, erroneous detection can be fully prevented, and more correct detection of land pre-pits is allowed.

It is preferred that the tracking speed of first bottom envelope circuit 32 and second bottom envelope circuit 34 be controlled to change. In this case, the optimum tracking speed is selected automatically corresponding to the rotating speed of the disk.

Figure 5:
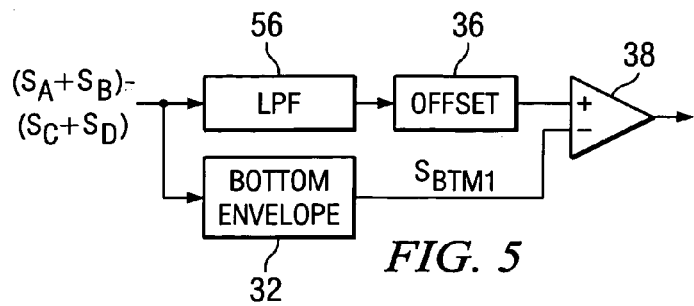
FIG. 5 is a block diagram illustrating a modified example of the land pre-pit signal extracting portion in the embodiment.
Figure 6:
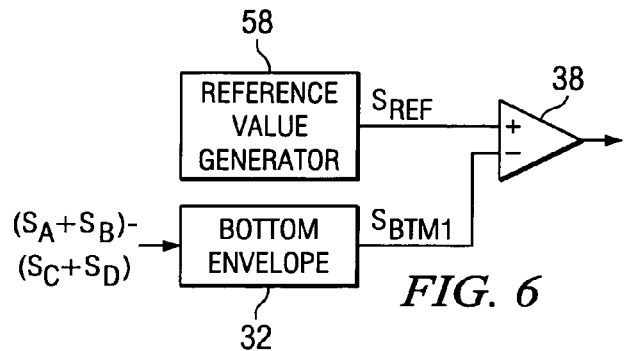
FIG. 6 is a block diagram illustrating another modified example of the land pre-pit signal extracting portion in the embodiment.

As modified examples of the embodiment, one may adopt the following schemes, although the land pre-pit detection precision and reliability are lower: a scheme in which second bottom envelope circuit 34 is replaced by low-pass filter 56 as shown in FIG. 5; a scheme in which threshold signal $S_{ref}$ with a constant level is sent from reference value generating circuit 58 to comparator 38 as shown in FIG. 6.

Various modifications can be made for push-pull signal generating portion 10. For example, one may omit low-pass filter 26, offset circuit 28, etc. depending on the frequency characteristics.

Also, as long as the scheme is appropriate for the push-pull method, any constitution may be adopted for photodetector PD. For example, the bisecting type maybe adopted. In the case of the bisecting type, the RF signals from a pair of light receiving regions are sent through an amplifier and an automatic gain controller to a subtractor without going through an adder, and one can obtain the push-pull signal from the output terminal of the subtracter.

Also, when land pre-pit signal $S_{LPP}$ with an inverted sign is detected, by replacing bottom envelope circuits 32, 34 in said land pre-pit signal extracting portion 12 with the equivalent top envelope circuits, respectively, one can extract land pre-pit signal $S_{LPP}$ from push-pull signal $(S_A+S_B)-(S_C+S_D)$ with the same function as.

Figure 7:
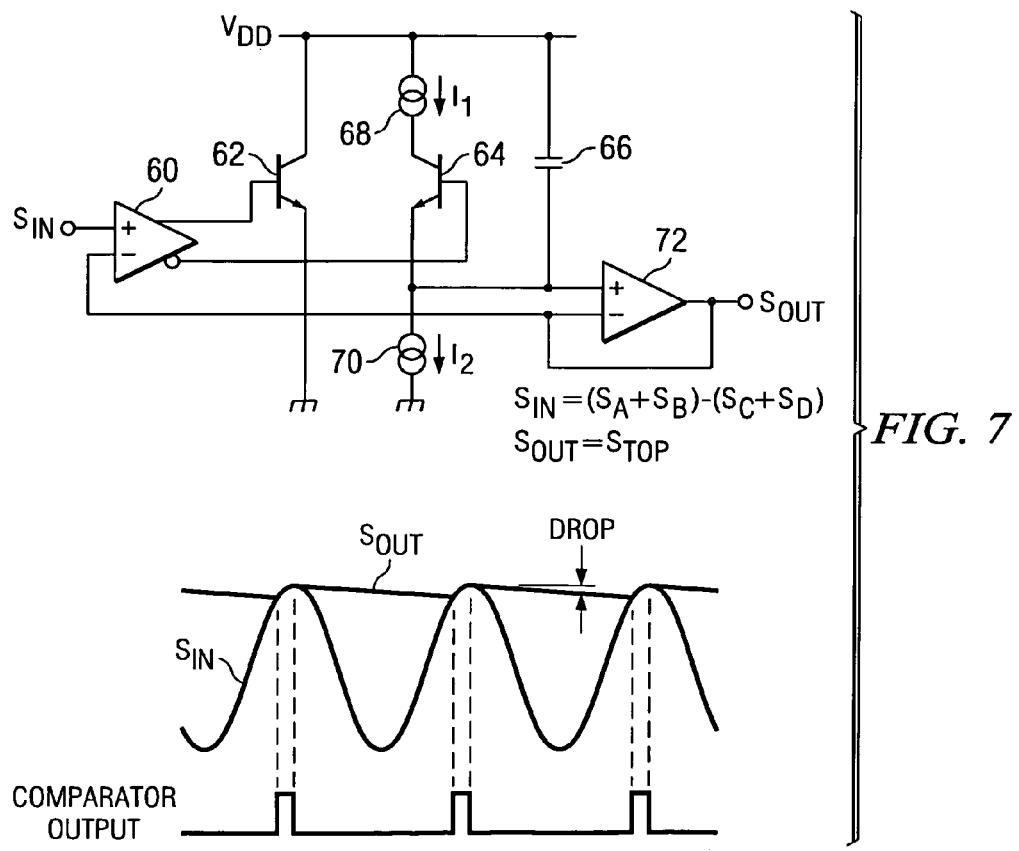
FIG. 7 is a circuit diagram illustrating an example of the circuit constitution of a top envelope circuit that can be used in the land pre-pit signal extracting portion in the embodiment.

FIG. 7 is a diagram illustrating an example of a circuit constitution of the top envelope circuit that can be used in this invention. This top envelope circuit has differential comparator 60 that generates complimentary binary logic outputs, a pair of PNP transistors 62, 64 connected to the non-inverting output terminal and inverting output terminal of comparator 60, respectively, capacitor 66 for holding, source type constant-current source circuit 68 for charging, sink type constant-current source circuit 70 for discharge, and voltage follower 72 for output buffer.

As shown in FIG. 7, differential comparator 60 compares the voltage level of input signal $S_{in}$ with the voltage level of output signal $S_{out}$, and, when input signal $S_{in}$ is higher than output signal $S_{out}$, it turns transistor 62 OFF, and turns transistor 64 ON. As a result, source type constant-current source circuit 68 charges hold capacitor 66 at a constant current $(I_1-I_2)$ through transistor 64 that is ON, so that the charging voltage of capacitor 66, and hence the voltage level of output signal $S_{out}$, rise as they track input signal $S_{in}$. As input signal $S_{in}$ reaches the top peak value and then turns to fall, and finally becomes lower than output signal $S_{out}$, differential comparator 60 turns transistor 62 ON and turns transistor 64 OFF. Then, sink type constant-current source circuit 70 discharges hold capacitor 66 at a constant current 12. As a result, the charging voltage of capacitor 66, and hence the voltage level of output signal $S_{out}$, fall at a nearly constant drop rate. As input signal $S_{in}$ becomes higher than output signal $S_{out}$, the same operation as is repeated. In this way, output $S_{out}$ representing the top envelope waveform of input signal $S_{in}$, that is, top envelope signal $S_{top}$, is obtained.

Just as in said bottom envelope circuits 32, 34 (FIG. 3), by adjusting currents 11 and 12 of constant-current source circuits 68, 70, said top envelope circuits can be controlled to change the tracking speed of input signal $S_{in}$ with respect to the top envelope.

According to this invention, by modifying the circuit constitution for the land pre-pit detecting circuit, especially the circuit constitution of land pre-pit signal extracting portion 12, in said embodiment, one can obtain a CAPA detecting circuit for detecting the CAPA (Complementary Allocated Pit Address) for the address information from the optical disk in DVD-RAM format.

Figure 8:
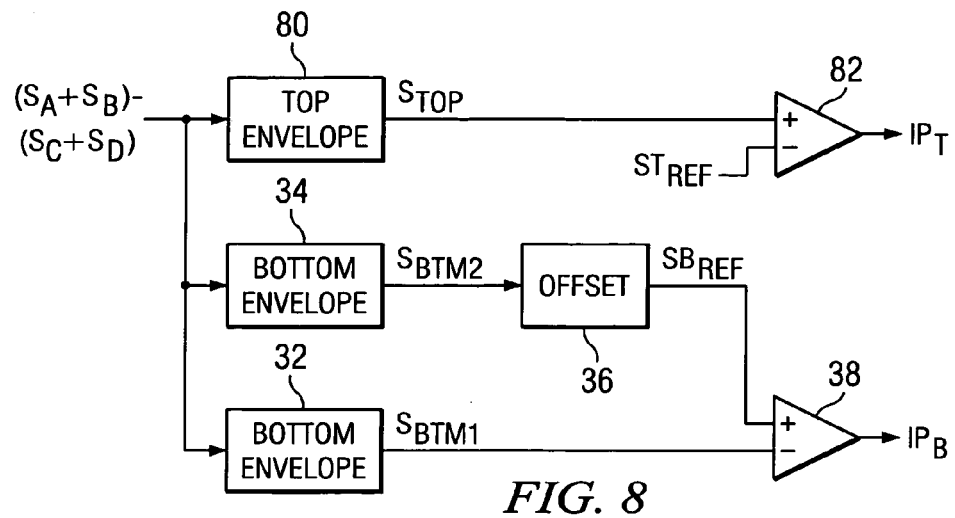
FIG. 8 is a block diagram illustrating the constitution of the main portion of the CAPA detecting portion in an embodiment.
Figure 9:
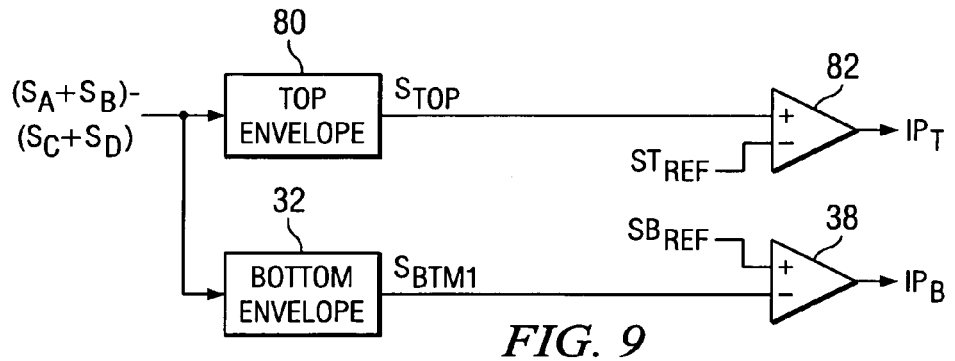
FIG. 9 is a block diagram illustrating a modified example of the CAPA detecting circuit in the embodiment.

FIGS. 8 and 9 illustrate an example of the constitution of the main portion of the CAPA detecting circuit in an embodiment. In the former section of this CAPA detecting circuit, for example, push-pull signal generating portion 10 shown in FIG. 1 or another push-pull signal generating circuit is set.

Figure 10:
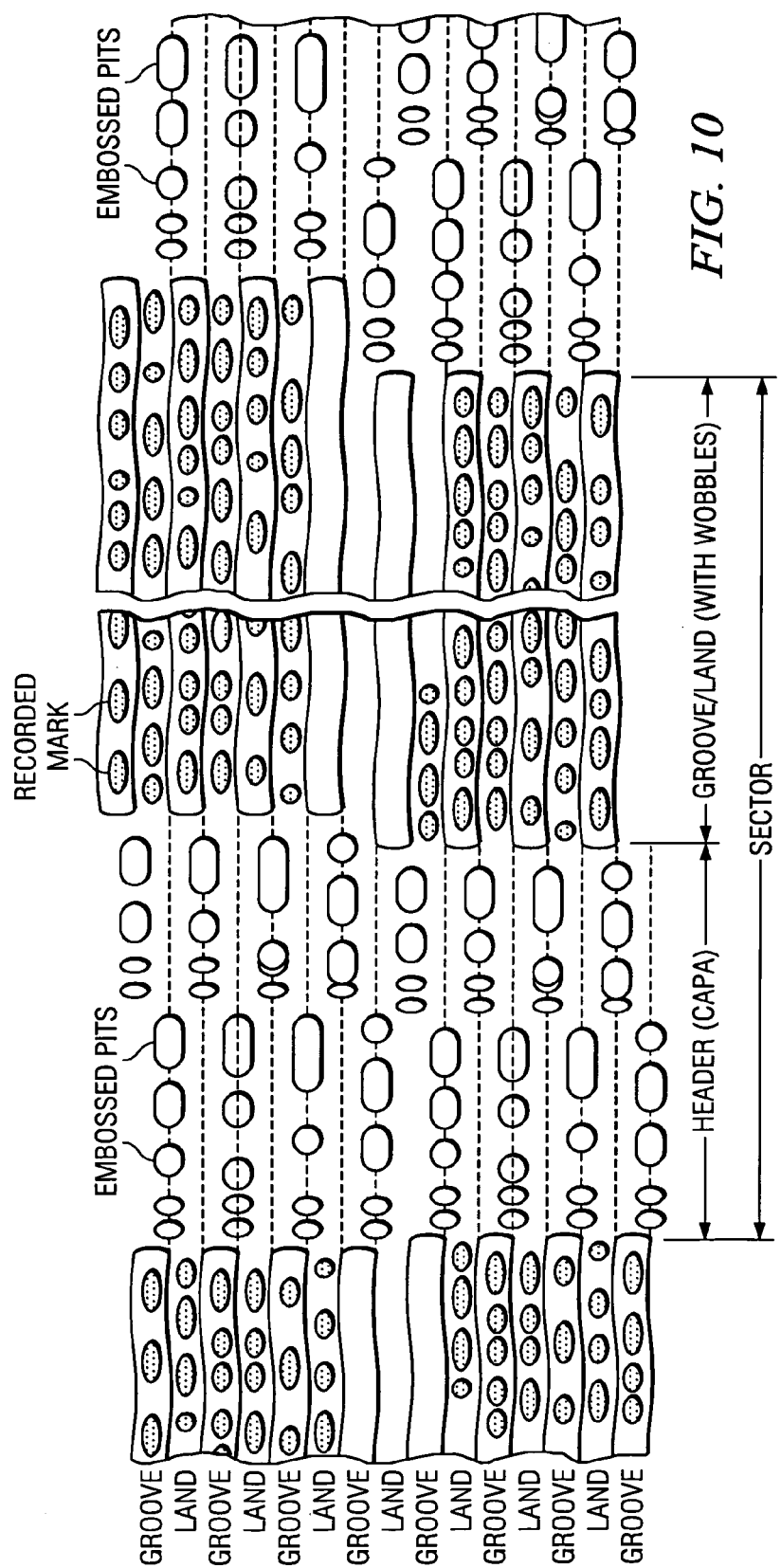
FIG. 10 is a diagram illustrating schematically the DVD-RAM format (especially CAPA).

As shown in FIG. 10, in the DVD-RAM format, rewrite of data can be performed on both the grooves and lands. Then, in the circumferential direction of the disk, the groove tracks and land tracks are divided into plural sectors (unit intervals). At the head portion of each sector, that is, the header, pit rows in a prescribed pattern are formed as marks of address information, that is, CAPA, by means of preformat in the track direction, and they are offset from each other by ½ track in the radial direction with respect to the grooves or lands.

Figure 11A:
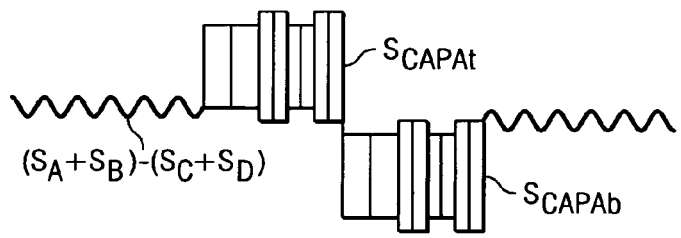
FIG. 11 is a schematic waveform diagram illustrating the CAPA signal in the DVD-RAM format.
Figure 11B:
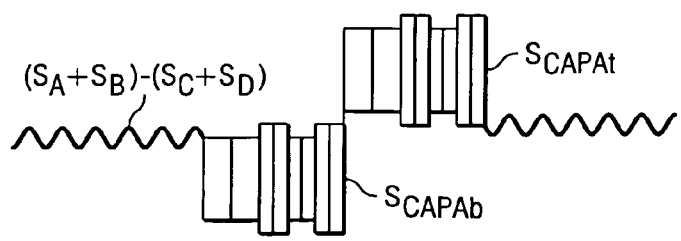

When the laser beam from an optical pickup tracks the grooves and tracks on an optical disk of DVD-RAM format, as shown in FIG. 11(A), in the former half with respect to the middle portion of push-pull signal $(S_A+S_B)-(S_C+S_D)$, CAPA signal $(CAPA_t)$ offset to the high level side appears. In the latter half, CAPA signal $(CAPA_b)$ offset to the low level side appears. When the laser beam tracks the lands and tracks, as shown in FIG. 11(B), in the former half with respect to the middle portion of push-pull signal $(S_A+S_B)-(S_C+S_D)$, CAPA signal $S_{CAPAb}$ offset to the low level side appears, and, in the latter half, CAPA signal $S_{CAPAt}$ offset to the high level side appears.

In fact, however, similar to DVD-R format or DVD-RW format, after data are recorded on the tracks (groove/land) on an optical disk, the RF signal component or data component corresponding to push-pull signal $(S_A+S_B)-(S_C+S_D)$ is left, and CAPA signals $(CAPA_b)$, $(CAPA_t)$ also become blurred and vague. By using the CAPA detecting circuit disclosed in the present invention, CAPA signals $S_{CAPAb}$, $S_{CAPAt}$ can be detected in a stable and reliable manner by using the push-pull signal $(S_A+S_B)-(S_C+S_D)$.

In the CAPA detecting circuit shown in FIG. 8, bottom envelope circuits (32), (34) and offset circuit (36), and comparator (38) have the same configuration and function as the land pre-bit extracting part (12) (FIG. 1). Therefore, the first bottom envelope circuit (32) generates the first envelope signal $S_{btm1}$, expressing the bottom envelope of push-pull signal $(S_A+S_B)-(S_C+S_D)$ at high sensitivity. The second bottom envelope circuit (34) with a low tracking speed generates the second envelope signal $S_{btm2}$ expressing the bottom envelope of push-pull signal $(S_A+S_B)-(S_C+S_D)$ at low sensitivity. Then, with the signal obtained by level shift treatment of said second bottom envelope signal $S_{btm2}$ using offset circuit (36) as threshold signal $SB_{ref}$ comparator (38) converts the first bottom envelope signal $S_{btm1}$ into a binary form. In this way, CAPA detecting signal $IP_b$ with a pulse waveform corresponding to CAPA signal $S_{CAPAb}$ on the low level side or having negative polarity can be generated.

In the CAPA detecting circuit shown in FIG. 8, top envelope circuit 80 and comparator 82 are for detecting CAPA signal $(CAPA_t)$ on the high level side or of the positive sign. Top envelope circuit 80 may have the circuit constitution shown in FIG. 7, and it generates top envelope signal $S_{top}$ that represents the top envelope waveform of push-pull signal $(S_A+S_B)-(S_C+S_D)$. Comparator 82 compares top envelope signal Stop from top envelope circuit 80 with a constant-level threshold signal $ST_{ref}$ from a reference value generator (not shown in the figure) and forms a binary value. As a result, it outputs CAPA detecting signal $IP_t$ with a pulse waveform corresponding to CAPA signal $S_{CAPAt}$ on the high level side or having a positive sign.

In the CAPA detecting circuit shown in FIG. 8, a low-pass filter may be used in place of second bottom envelope circuit 34. Also, by means of a second top envelope circuit and an offset circuit with a low tracking speed, threshold signal $ST_{ref}$ with respect to top envelope signal $S_{top}$ can be formed.

Also, as shown in FIG. 9, one may also adopt a constitution in which constant-level threshold signal $SB_{ref}$ can be provided with respect to bottom envelope signal $S_{btm1}$ from a reference value generator (not shown in the figure).

Also, for the circuit that outputs CAPA detecting signal $IP_t$, one may use two top envelope circuits having different sensitivities to form the same constitution as that of the circuit that outputs CAPA detecting signal $IP_b$.

Figure 12:
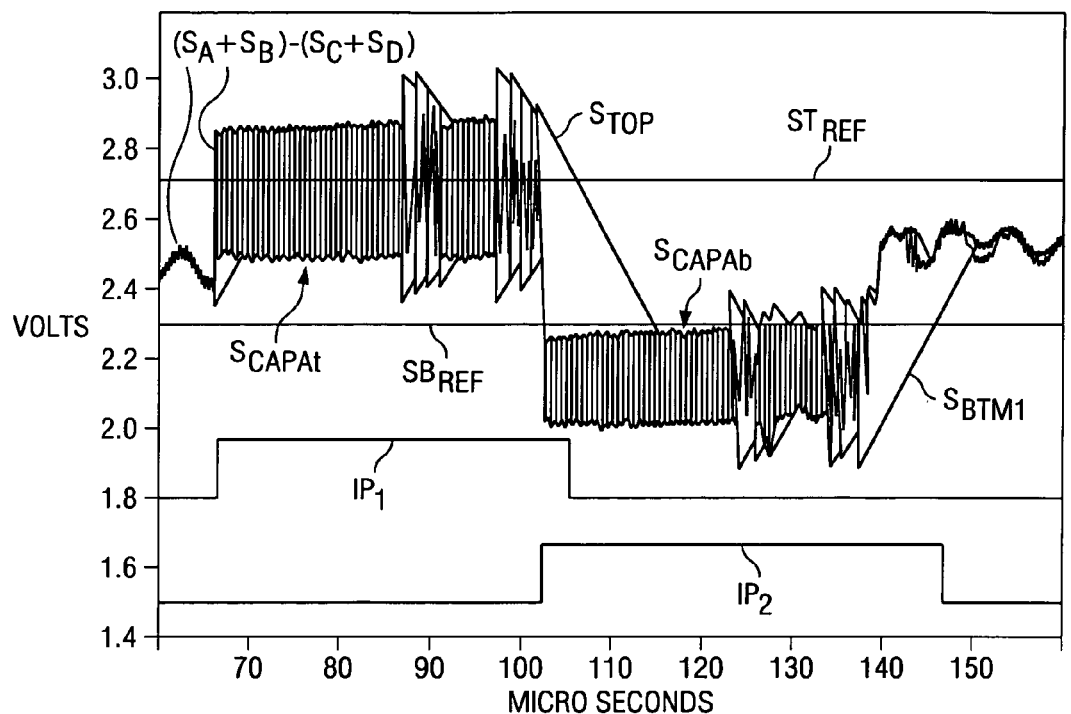
FIG. 12 is a simulation waveform diagram illustrating the function of the CAPA detecting circuit in the embodiment (FIG. 9).

FIG. 12 is a diagram illustrating a simulation waveform showing the function in the CAPA detecting circuit shown in FIG. 9. In this simulation, the drop rate of bottom envelope circuit 32 and the drop rate of top envelope circuit 80 are both set at 50 mV/μs. Also, with respect to bottom envelope signal $S_{btm1}$, threshold signal $SB_{ref}$ is set on a level offset by −180 mV to the lower level side from the central level. With respect to selecting bottom envelope signal $S_{btm1}$, threshold signal $SB_{ref}$ is set on a level offset by +180 mV to the higher level side from the central level. As shown in the figure, according to this invention, it is possible to stably and reliably detect CAPA detecting signals $IP_b$, $IP_t$ corresponding to CAPA signals $S_{CAPAb}$ and $S_{CAPAT}$, respectively.

In the above, preferable embodiments of this invention for a device for detecting marks (land pre-pits) of address information from optical disks of DVD-R format or DVD-RW format and for a device for detecting marks (CAPA) of address information from optical disks of DVD-RAM format have been explained. However, this invention is not limited to these formats. It may also be adopted in other devices for detecting any marks for prescribed information from optical disks having tracks formed in spiral shape with waviness having a fixed period.

As explained above, by means of the address mark detecting circuit for optical disks in this invention, one can stably and reliably detect marks for address information from an optical disk having tracks formed in a spiral shape and having waviness with a fixed period.

The invention claimed is:

1. An address mark detecting circuit for an optical disk used in detecting marks for address information from an optical disk that has tracks formed in a spiral shape with waviness having a fixed period comprising:
   a push-pull signal generator that differentially detects the returning light of an optical beam, which performs tracking for the tracks on said optical disk, by means of the push-pull method, and generates a push-pull signal;
   a first envelope detector that follows the bottom envelope or the top envelope of said push-pull signal, and generates a first envelope signal representing the waveform of said bottom envelope or top envelope;
   a threshold signal generator that provides a threshold signal for converting the level of said envelope signal to a binary form, comprising
      a second envelope detector that follows the bottom envelope or top envelope of said push-pull signal at a tracking speed lower than that in said first envelope detector and generates a second envelope signal that represents the waveform of said bottom envelope or top envelope,
      and a level shift circuit that performs level shifting for said second envelope signal by a prescribed value and takes the obtained signal as said threshold signal; and
   an address mark detecting signal generator that compares the level of said envelope signal with the level of said threshold signal, and generates an address mark detecting signal representing said address marks.

2. An address mark detecting circuit for an optical disk used in detecting marks for address information from an optical disk that has tracks formed in a spiral shape with waviness having a fixed period comprising:
   a push-pull signal generator that differentially detects the returning light of an optical beam, which performs tracking for the tracks on said optical disk, by means of the push-pull method, and generates a push-pull signal;
   a first envelope detector that follows the bottom envelope or the top envelope of said push-pull signal, and generates a first envelope signal representing the waveform of said bottom envelope or top envelope;
   a threshold signal generator that provides a threshold signal for converting the level of said envelope signal to a binary form, comprising
      a low-pass filter that lets the low-frequency portion of said push-pull signal pass through while cutting off the high-frequency portion, and a level shift circuit that level shifts the output signal of said low-pass filter by a prescribed value to get said threshold signal; and an address mark detecting signal generator that compares the level of said envelope signal with the level of said threshold signal, and generates an address mark detecting signal representing said address marks.

3. An address mark detecting circuit for an optical disk used in detecting marks for address information from an optical disk that has tracks formed in a spiral shape with waviness having a fixed period comprising:

a push-pull signal generator that differentially detects the returning light of an optical beam, which performs tracking for the tracks on said optical disk, by means of the push-pull method, and generates a push-pull signal;

a light detector which receives light by a first group of light receiving regions and a second group of light receiving regions that bisect the returning light of said light beam from said optical disk in the radial direction, and which outputs electrical signals corresponding to the light intensity of said returning light in the various light receiving regions belonging to said groups, a first adding circuit that determines the sum of plural said electrical signals obtained from said light receiving regions of said first group to generate a first sum signal, a second adding circuit that determines the sum of plural said electrical signals obtained from the light receiving regions of said second group to generate a second sum signal, a subtracting circuit that determines the difference between said first sum signal and said second sum signal to generate said push-pull signal;

a first envelope detector that follows the bottom envelope or the top envelope of said push-pull signal, and generates a first envelope signal representing the waveform of said bottom envelope or top envelope;

a threshold signal generator that provides a threshold signal for converting the level of said envelope signal to a binary form; and an address mark detecting signal generator that compares the level of said envelope signal with the level of said threshold signal, and generates an address mark detecting signal representing said address marks.

4. The address mark detecting circuit for an optical disk described in claim 3 wherein said push-pull signal generator has a first automatic gain controller and a second automatic gain controller that automatically controls the gains of amplification for said first electrical signal and second electrical signal, respectively, such that the amplitude of the data component contained in said first sum signal is nearly equal to that of the data component contained in said second sum signal.

5. A mark detecting circuit for an optical disk comprising:

an input terminal for input of a radial push-pull signal having a first signal component corresponding to the physical shape of the recording region of the optical disk recording medium and a second signal component corresponding to the marks for prescribed information recorded on said recording region;

a first signal generating circuit that generates a first signal tracking the top envelope or bottom envelope of said radial push-pull signal and corresponding to the waveform of said top envelope or bottom envelope;

a second signal generating circuit that has tracking characteristics that are faster than the tracking characteristics of said first signal generating circuit, and generates a second signal tracking the top envelope or bottom envelope of said radial push-pull signal and corresponding to the waveform of said top envelope or bottom envelope;

and a mark detecting circuit generating circuit that compares said first signal and said second signal to generate a mark detecting signal corresponding to said second signal component.

6. The mark detecting circuit for an optical disk described in claim 5 wherein said first signal and second signal are bottom envelope signals.

7. The mark detecting circuit for an optical disk described in claim 6 further comprising an offset circuit that provides a prescribed offset to said first signal, and said mark detection signal generating circuit has a comparator that compares said first signal with said offset imparted to it and said second signal.

8. The mark detecting circuit for an optical disk described in claim 7 wherein said first signal component is a wobble signal component, and said second signal component is a land pre-pit signal component.

* * * * *